(12) United States Patent
Fujita

(10) Patent No.: US 8,368,901 B2
(45) Date of Patent: Feb. 5, 2013

(54) ENCODER

(75) Inventor: Hiromasa Fujita, Hachioji (JP)

(73) Assignee: Olympus Corporation, Tokyo (JP)

( * ) Notice: Subject to any disclaimer, the term of this patent is extended or adjusted under 35 U.S.C. 154(b) by 253 days.

(21) Appl. No.: 12/884,397

(22) Filed: Sep. 17, 2010

(65) Prior Publication Data

US 2011/0069321 A1    Mar. 24, 2011

(30) Foreign Application Priority Data

Sep. 18, 2009    (JP) .................................. 2009-217929

(51) Int. Cl.
*G01B 11/14*    (2006.01)
(52) U.S. Cl. ....................................................... 356/614
(58) Field of Classification Search .................. None
See application file for complete search history.

(56) References Cited

U.S. PATENT DOCUMENTS

2002/0024335 A1 *   2/2002   Kiriyama et al. ......... 324/207.17
2007/0246647 A1 *  10/2007   Hare et al. ................ 250/231.13

FOREIGN PATENT DOCUMENTS

JP           6-26817          2/1994

* cited by examiner

*Primary Examiner* — Tu Nguyen
(74) *Attorney, Agent, or Firm* — Scully Scott Murphy & Presser, PC

(57) ABSTRACT

An encoder includes one or more encoder heads, one signal processing unit, a connector unit. The one or more encoder heads detect relative displacement of the one or more encoder heads and one or more scales. The one signal processing unit processes one or more electric signals output from the one or more encoder heads. The connector unit is located on the side of the one or more encoder heads between the one or more encoder heads and the signal processing unit and which groups together the one or more electric signals output from the one or more encoder heads.

16 Claims, 6 Drawing Sheets

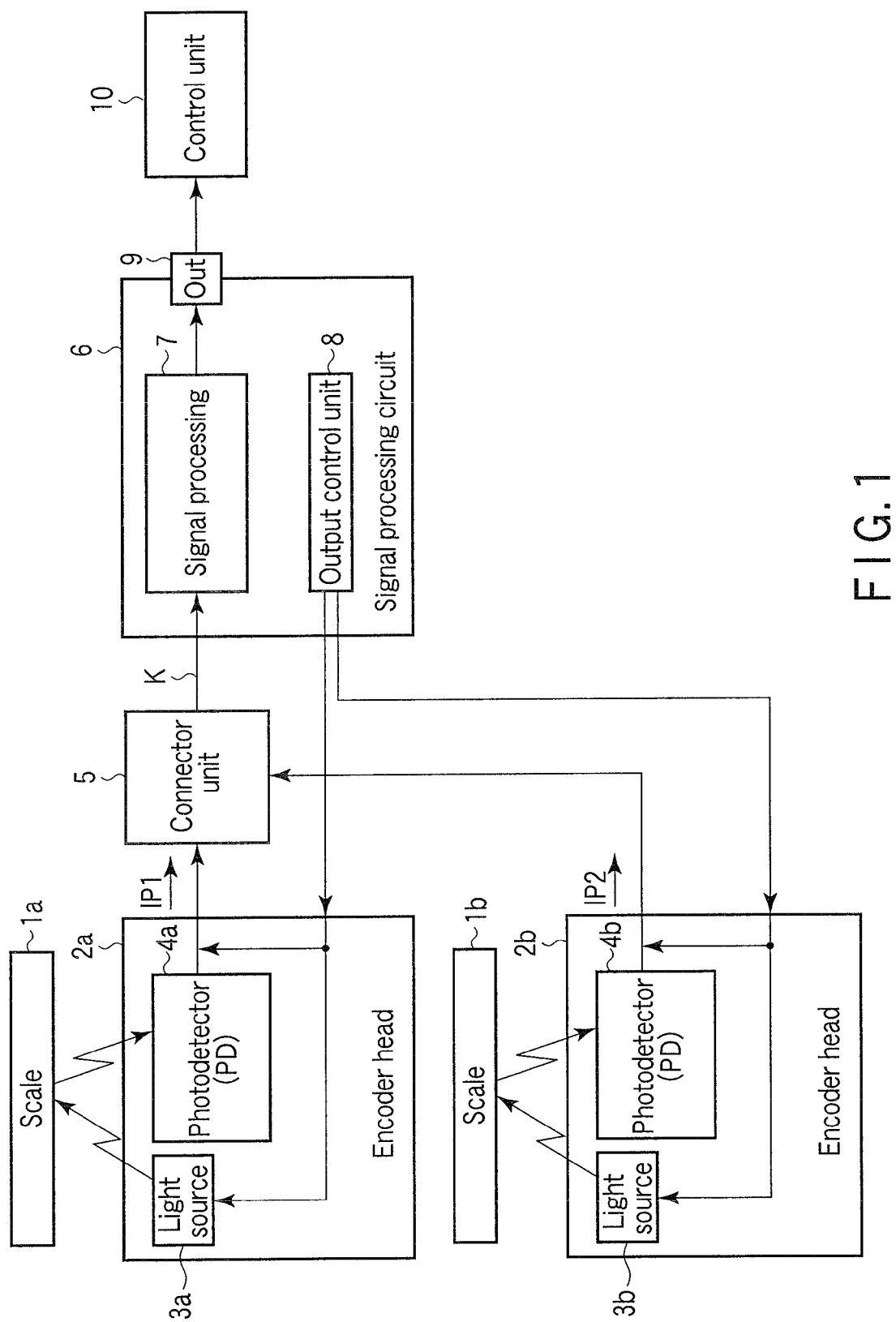
F I G. 1

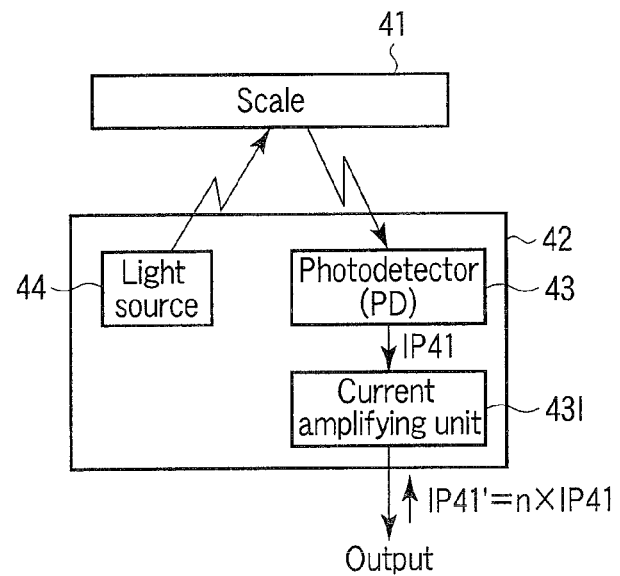
F I G. 5A
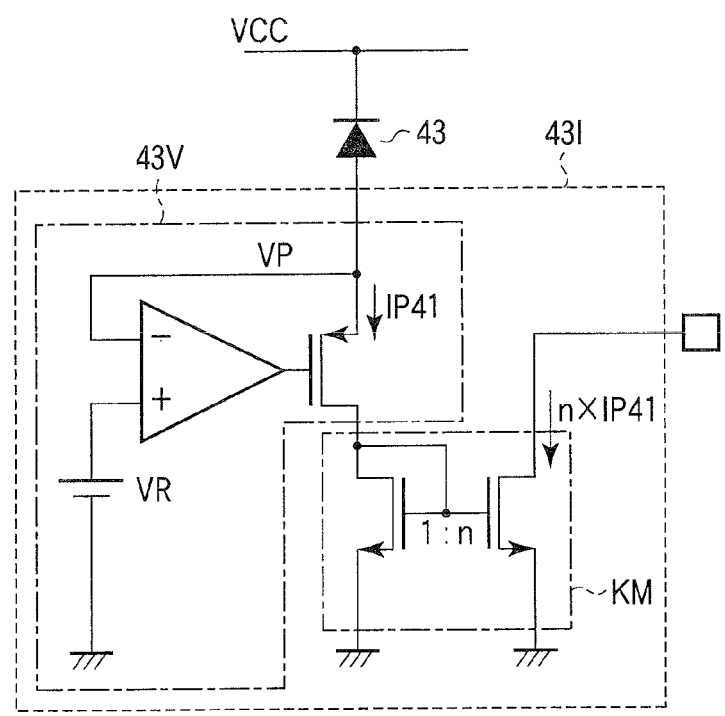
F I G. 5B

ENCODER

CROSS-REFERENCE TO RELATED APPLICATIONS

This application is based upon and claims the benefit of priority from prior Japanese Patent Application No. 2009-217929, filed Sep. 18, 2009, the entire contents of which are incorporated herein by reference.

BACKGROUND OF THE INVENTION

1. Field of the Invention

The present invention relates to an encoder used in, for example, a displacement sensor.

2. Description of the Related Art

An encoder generates a plurality of periodic signals different in phase from one another. If the periodic signals generated by the encoder are supplied to a processing circuit for counting cycles, the traveling direction, position, displacement and displacement velocity of an object under test can be measured.

FIG. 6 shows a configuration diagram of a conventional encoder. A resistance 102 for applying a predetermined current is connected in series to a light source 101. A light emitted from the light source 101 is applied to a scale 103. The scale 103 has a periodic optical pattern. The scale 103 moves relative to the light source 101. The light emitted from the light source 101 is applied to the scale 103 so that a reflected light, a diffracted light, a scattered light and a transmitted light are generated from the scale 103. The reflected light, diffracted light, scattered light and transmitted light enter two light receiving elements 104A, 104B. The light receiving elements 104A, 104B are disposed at corresponding positions different in phase 180 degrees from each other. The light receiving elements 104A, 104B output photocurrents corresponding to intensity changes of the reflected light, diffracted light, scattered light and transmitted light from the scale 103 in order to detect a movement amount of the scale 103.

The photocurrent generated by one light receiving element 104A is input to current/voltage converting means comprising a resistance 105A and an operational amplifier 106A and converted into a voltage signal VPA. The photocurrent generated by the other light receiving element 104B is input to current/voltage converting means comprising a resistance 105B and an operational amplifier 106B and converted into a voltage signal VPAB.

Each of the voltage signals VPA, VPAB contains a direct-current component which is a light component of a given intensity and noise equally included in both of the voltage signals VPA, VPAB, in addition to an alternating-current component which is a component of the intensity change from the scale 103.

Subtracting means 107 is connected to the subsequent stage of the current/voltage converting means in order to eliminate the noise. The subtracting means 107 performs an operation VREF-(VPAB-VPA) by use of a reference voltage VREF which appears due to a resistance 108 and by use of the voltage signals VPAB, VPA output from the current/voltage converting means, in order to eliminate the noise. As a result of the above operation, a periodic signal which only includes the intensity change from the scale 103 as a signal component is obtained. The reference voltage VREF is supplied to the operational amplifiers 106A, 106B and the subtracting means 107 and serves as a reference of the periodic signal.

The encoder performs the above-described signal processing, and obtains a plurality of periodic signals for use as encoder signals.

An encoder technique is disclosed in, for example, Jpn. Pat. Appln. KOKAI Publication No. 6-26817.

The encoder has the processing circuit shown in FIG. 6 installed in an encoder head to process the photocurrents output from the light receiving elements 104A, 104B. The encoder also comprises an exclusive circuit for processing the photocurrents.

Some robots have hands equal in size to, for example, human hands. For example, there is a robot having a hand with five fingers. This robot has joints provided in the fingers of the hands. In order to provide the joints in the hands of the robot, about three encoders are needed for each finger of the hand. If a multijoint robot is configured, the number of joints in the hands of the robot increases. Accordingly, the number of encoders installed in the hands of the robot increases. To mount a great number of encoders in the multijoint robot, there are difficult aspects in the encoder size and in the degree of freedom of encoder attachment.

When the number of wiring lines for a great number of encoders is taken into consideration, at least a power supply V/GND and two signal lines are needed for the operation and detection of one encoder. Even if the power supply V/GND for all of the encoders can be supplied by the same wiring line, 30 or more signal lines are needed, for example, when encoders are installed for all the joints of five fingers. It is not easy to run these signal lines.

BRIEF SUMMARY OF THE INVENTION

An encoder according to a first aspect of the present invention comprises one or more encoder heads which detect relative displacement of the one or more encoder heads and one or more scales, one signal processing unit which processes one or more electric signals output from the one or more encoder heads, and a connector unit which is located on the side of the one or more encoder heads between the one or more encoder heads and the signal processing unit and which groups together the one or more electric signals output from the one or more encoder heads.

An encoder according to a second aspect of the present invention comprises one or more scales, one or more encoder heads which detect relative displacement of the one or more encoder heads and the one or more scales, one signal processing unit which processes one or more electric signals output from the one or more encoder heads, each of the one or more encoder heads including a light source which radiates light, and a photodetector which detects a pattern generated by transmission, reflection or interference caused when the light radiated from the light source is applied to the one or more scales, an output control unit which is located at the subsequent stage of the one or more encoder heads and which outputs the electric signal of the one or more encoder heads, and a connector unit which is located at the subsequent stage of the one or more encoder heads and at the prior stage of the signal processing unit and which groups together the one or more electric signals output from the one or more encoder heads, wherein the signal processing unit processes the one or more electric signals from the one or more encoder heads and then outputs the electric signals as a signal for one encoder head.

BRIEF DESCRIPTION OF THE SEVERAL VIEWS OF THE DRAWING

FIG. 1 is a configuration diagram showing a first embodiment of an encoder according to the present invention;

FIG. 5A is a block configuration diagram showing a scale and an encoder head in a fifth embodiment of an encoder according to the present invention;

FIG. 5B is a circuit configuration diagram showing a photodetector and a current amplifying unit in the fifth embodiment of the encoder according to the present invention.

DETAILED DESCRIPTION OF THE INVENTION

Figure 2:
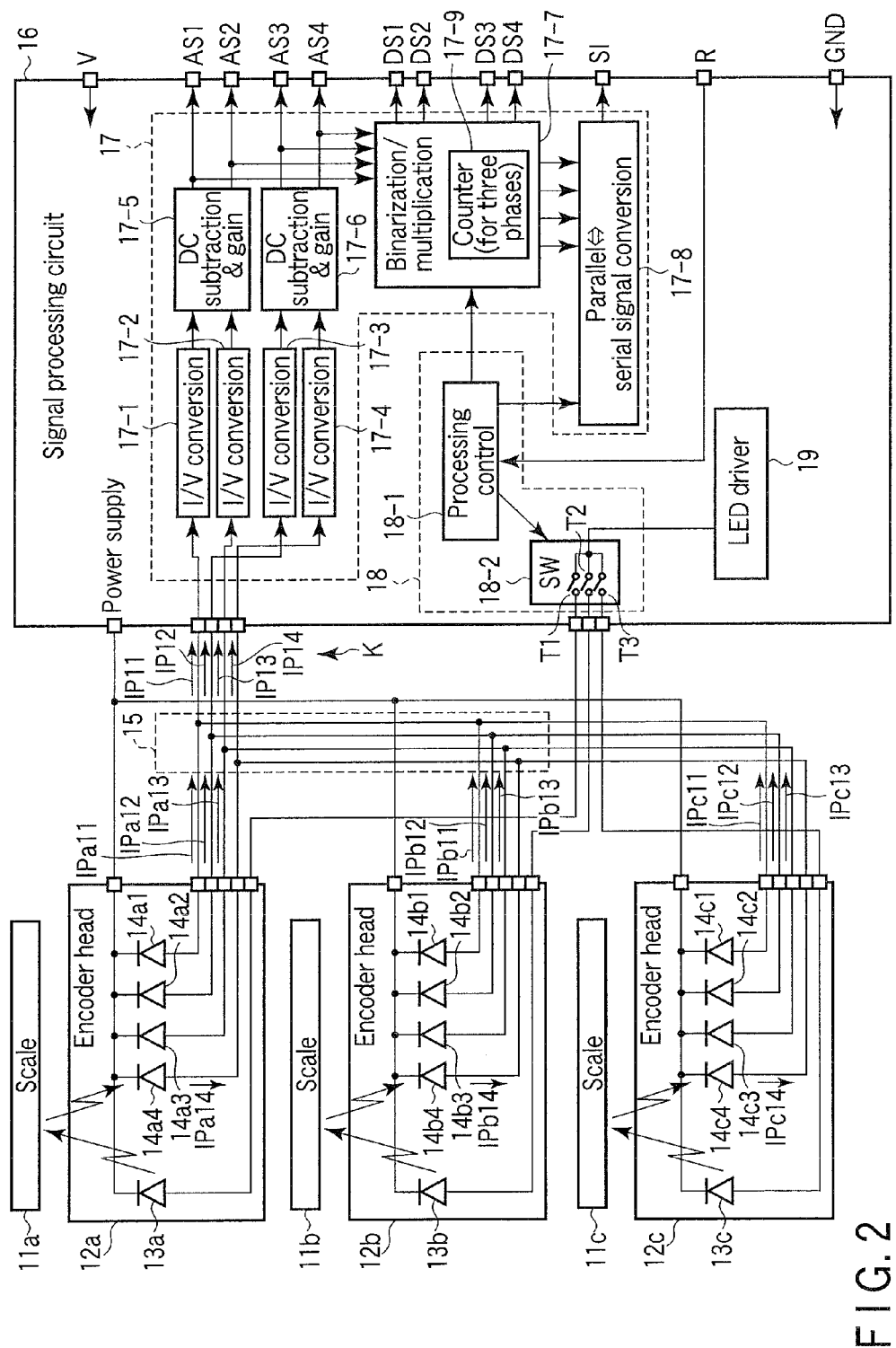
FIG. 2 is a configuration diagram showing a second embodiment of an encoder according to the present invention.

A first embodiment of the present invention will hereinafter be described with reference to the drawings.

FIG. 1 shows a configuration diagram of an encoder. The present encoder comprises, for example, two scales 1a, 1b having a pattern of a predetermined period formed therein, and, for example, two encoder heads 2a, 2b. The scale 1a and the encoder head 2a are provided to face each other. The scale 1b and the encoder head 2b are provided to face each other. The scale 1a and the encoder head 2a are displaced relative to each other. The scale 1b and the encoder head 2b are displaced relative to each other.

The encoder heads 2a, 2b are equipped with light sources (including coherent light sources) 3a, 3b and photodetectors (PD) 4a, 4b, respectively. Each of the light sources 3a, 3b includes a coherent light source. Each of the light sources 3a, 3b comprises, for example, an LED.

Lights emitted from the light sources 3a, 3b are applied to the scales 1a, 1b, and thereby reflected, diffracted and scattered and then again enter the encoder heads 2a, 2b, respectively. The lights which have again entered the encoder heads 2a, 2b change in amount due to relative displacement amounts of the scales 1a, 1b and the encoder heads 2a, 2b. The photodetectors 4a, 4b detect the amounts of the lights which have again entered the encoder heads. The photodetectors 4a, 4b generate currents proportionate to these light amounts, and output the currents as current signals IP1, IP2, respectively.

The encoder heads 2a, 2b output the current signals IP1, IP2 that change due to the relative displacement of the scales 1a, 1b and the encoder heads 2a, 2b, respectively. Each of the current signals IP1, IP2 includes one or more pieces of phase information for each of the encoder heads 2a, 2b.

Output terminals of the photodetectors 4a, 4b are connected to a connector unit 5. The connector unit 5 connects the output terminals of the photodetectors 4a, 4b in the encoder heads 2a, 2b to a signal processing circuit 6. The connector unit 5 is located on the side of the encoder heads 2a, 2b between the encoder heads 2a, 2b and the signal processing circuit 6, and groups together electric signals output from the encoder heads 2a, 2b. That is, the connector unit 5 transforms the current signals IP1, IP2 including the phase information output from the encoder heads 2a, 2b into a serial state, and outputs the current signals onto one output line K. The current signals IP1, IP2 output from the output line K are input to the signal processing circuit 6.

The signal processing circuit 6 includes, for example, a signal processing unit 7, an output control unit 8, and an LED driver for driving the light sources 3a, 3b. The signal processing unit 7 processes the current signals IP1, IP2 input through the connector unit 5. The signal processing circuit 6 outputs, from one output terminal 9, one or both of the current signals IP1, IP2 of a plurality of, for example, two encoder heads 2a, 2b. Otherwise, the signal processing circuit 6 may alternately output the current signals IP1, IP2 from a plurality of, for example, two encoder heads 2a, 2b. The output control unit 8 selectively outputs or indicates the current signal IP1, IP2 from one of a plurality of, for example, two encoder heads 2a, 2b.

Now, the operation of the encoder having the configuration described above is described.

The scale 1a and the encoder head 2a are displaced relative to each other, and the scale 1b and the encoder head 2b are displaced relative to each other. If lights enter from the light sources 3a, 3b in this condition, the lights are applied to the scales 1a, 1b, and thereby reflected, diffracted and scattered and then again enter the encoder heads 2a, 2b, respectively. The lights which have again entered the encoder heads 2a, 2b change in amount due to relative displacement amounts of the scales 1a, 1b and the encoder heads 2a, 2b. The photodetectors 4a, 4b detect the amounts of the lights which have again entered the encoder heads 2a, 2b. The photodetectors 4a, 4b generate currents proportionate to these light amounts, and output the currents as the current signals IP1, IP2 having the phase information, respectively.

The current signals IP1, IP2 are transformed into a serial state through the connector unit 5, and are then output onto one output line K and input to the signal processing circuit 6. In the signal processing circuit 6, the signal processing unit 7 processes the current signals IP1, IP2 input through the connector unit 5. An output of the signal processing circuit 6 is sent to, for example, a control unit 10 of an apparatus that uses the present encoder.

Thus, according to the first embodiment, the connector unit 5 is provided to transform the current signals IP1, IP2 including the phase information output from the encoder heads 2a, 2b into a serial state and output the current signals onto one output line K. As a result, the number of wiring lines between the connector unit 5 and the signal processing circuit 6 can be smaller, and the degree of freedom in running the wiring lines can be ensured. In particular, a short distance is set between each of the encoder heads 2a, 2b and the connector unit 5 to allow for a higher degree of freedom in running the wiring lines between the connector unit 5 and the signal processing circuit 6.

Each of the encoder heads 2a, 2b only uses a small number of components including the light source 3a, 3b and the photodetector 4a, 4b. Each of the encoder heads 2a, 2b includes no components or circuits having a large area, and can therefore be significantly small in size. Each of the encoder heads 2a, 2b can be freely configured in shape or size, and can ensure the degree of freedom in designing, which is suitable for a case where a plurality of encoders are needed in a small place.

For example, if a multijoint robot is configured, the number of joints in the hands of the multijoint robot increases, and the number of encoders to be installed increases accordingly. The present encoder can be smaller in size and can be freely configured in shape or size. Therefore, a great number of encoders can be installed in the multijoint robot.

From the perspective of wiring, the degree of freedom in running the wiring lines in, for example, the multijoint robot can be ensured because the current signals IP1, IP2 output from the encoder heads 2a, 2b can be output after transformed into a serial state by the connector unit 5.

The signal processing circuit 6 to which a plurality of encoders are connected has only to have input/output lines substantially suited to at least one encoder, for example, one output line system K even if there are a plurality of encoders. This makes it possible to effectively ensure the degree of freedom in the designing of the encoder.

The configuration of the present encoder shown in FIG. 1 only illustrate minimum requirements, but can still provide similar advantages even with any additional necessary components. For example, the light sources 3a, 3b and the photodetectors 4a, 4b are only illustrated in the encoder heads 2a, 2b. However, the encoder heads 2a, 2b may be provided with circuits for amplifying the signals output by the photodetector 4a, 4b, or may be provided with slits for improving the coherency of the light sources. The encoder illustrated in FIG. 1 is a reflection type, but may be changed to a transmission type by using the individual encoder heads. The present encoder may otherwise be a linear type or rotary type.

Next, a second embodiment of the present invention is described with reference to the drawings.

FIG. 2 shows a configuration diagram of an encoder. The present encoder comprises three encoder heads 12a, 12b, 12c. A first scale 11a and the first encoder head 12a are provided to face each other. A second scale 11b and the second encoder head 12b are provided to face each other. A third scale 11c and the third encoder head 12c are provided to face each other. The first scale 11a and the first encoder head 12a are displaced relative to each other. The second scale 11b and the second encoder head 12b are displaced relative to each other. The third scale 11c and the third encoder head 12c are displaced relative to each other.

The first to third encoder heads 12a, 12b, 12c include light sources 13a, 13b, 13c, respectively. Each of the light sources 13a, 13b, 13c includes, for example, a coherent light source, and a slit for urging coherence. Each of the light sources 13a, 13b, 13c comprises, for example, an LED.

The first encoder head 12a includes four photodetectors (PD) 14a1, 14a2, 14a3, 14a4. The second encoder head 12b includes four photodetectors (PD) 14b1, 14b2, 14b3, 14b4. The third encoder head 12c includes four photodetectors (PD) 14c1, 14c2, 14c3, 14c4.

The photodetectors 14a1, 14a2, 14a3, 14a4 of the first encoder head 12a receive displacement signals different in phase information 90 degrees from one another. The photodetectors 14a1, 14a2, 14a3, 14a4 detect the amounts of the lights that have entered. The photodetectors 14a1, 14a2, 14a3, 14a4 generate currents proportionate to these light amounts, and output current signals IPa11, IPa12, IPa13, IPa14 having phase information, respectively.

The photodetectors 14b1, 14b2, 14b3, 14b4 of the second encoder head 12b receive displacement signals different in phase information 90 degrees from one another. The photodetectors 14b1, 14b2, 14b3, 14b4 detect the amounts of the lights that have entered. The photodetectors 14b1, 14b2, 14b3, 14b4 generate currents proportionate to these light amounts, and output current signals IPb11, IPb12, IPb13, IPb14 having phase information, respectively.

The photodetectors 14c1, 14c2, 14c3, 14c4 of the third encoder head 12c receive displacement signals different in phase information 90 degrees from one another. The photodetectors 14c1, 14c2, 14c3, 14c4 detect the amounts of the lights that have entered. The photodetectors 14c1, 14c2, 14c3, 14c4 generate currents proportionate to these light amounts, and output current signals IPc11, IPc12, IPc13, IPc14 having phase information, respectively.

Regarding the photodetectors (PD) 14a1, 14a2, . . . , 14c4 of the first to third encoder heads 12a to 12c, a plurality of photodetectors (PD) in phase may be provided in each encoder head, and output terminals of these photodetectors (PD) may be connected to one another.

For example, the four photodetectors (PD) 14a1, 14a2, 14a3, 14a4 of the first encoder head 12a output current signals including displacements different in phase information 90 degrees from one another, for example, phases 0°, 90°, 180°, 270°. For example, instead of one photodetector (PD) 14a1, a plurality of photodetectors (PD) 14a1 may be provided to correspond to the phase 0°, and output terminals of these photodetectors (PD) 14a1 may be connected to one another. Current signals output from the photodetectors (PD) 14a1 corresponding to the phase 0° are synthesized into the current signal IPa11.

Similarly, for example, instead of one photodetector (PD) 14a2, 14a3, 14a4, a plurality of photodetectors (PD) 14a2, 14a3, 14a4 may be provided to correspond to the phase 90°, 180°, 270° and output terminals of these photodetectors (PD) 14a2, 14a3, 14a4 may be connected to one another. Regarding the photodetectors (PD) 14b1, 14b2, . . . , 14c4 of the second, third encoder head 12b, 12c, a plurality of photodetectors (PD) of the same phase 0°, 90°, 180°, 270° may be provided and output terminals of these photodetectors (PD) having the phase 0°, 90°, 180°, 270° may be connected to one another.

A connector unit 15 is connected between the first to third encoder heads 12a, 12b, 12c and a signal processing circuit 16. The connector unit 15 is located at the subsequent stage of the first to third encoder heads 12a, 12b, 12c and at the prior stage of the signal processing circuit 16. The connector unit 15 groups together current signals output from the first to third encoder heads 12a, 12b, 12c.

The connector unit 15 connects output lines of N encoder heads, here, three first to third encoder heads 12a, 12b, 12c at one to N−1 places, here, two places.

The connector unit 15 connects output terminals which output the current signals including the same kind of phase information, for example, the phase 0°, 90°, 180°, 270°, out of the output terminals of the photodetectors 14a1, 14a2, 14c4 of the three first to third encoder heads 12a, 12b, 12c. The connector unit 15 groups together the current signals including the same kind of phase information, out of the current signals IPa11, IPa12, . . . , IPc14 output from the photodetectors 14a1, 14a2, . . . , 14c4.

That is, the connector unit 15 groups the current signals IPa11, IPa12, IPa13, IPa14 including the phase information output from the first encoder head 12a, the current signals IPb11, IPb12, IPb13, IPb14 including the phase information output from the second encoder head 12b, and the current signals IPc11, IPc12, IPc13, IPc14 including the phase information output from the third encoder head 12c, into current signals including the same phase information, for example, the phase 0°, 90°, 180°, 270°. Then, the connector unit 15 outputs the grouped current signals through separate output line systems K. The output line systems K include, for example, four lines for the phases 0°, 90°, 180°, 270°.

Here, the connector unit 15 outputs the current signals IPa11, IPb11, IPc11 including the phase information for the phase 0° as a first signal IP11. Similarly, the connector unit 15 outputs the current signals IPa12, IPb12, IPc12 including the phase information for the phase 90° as a second signal IP12. The connector unit 15 outputs the current signals IPa13, IPb13, IPc13 including the phase information for the phase 180° as a third signal IP13. The connector unit 15 outputs the current signals IPa14, IPb14, IPc14 including the phase information for the phase 270° as a fourth signal IP14.

The outputs of the connector unit 15 are:

First signal $IP11 = IPa11 + IPb11 + IPc11$ (1)

Second signal $IP12 = IPa12 + IPb12 + IPc12$ (2)

Third signal $IP13 = IPa13 + IPb13 + IPc13$        (3)

Fourth signal $IP14 = IPa14 + IPb14 + IPc14$        (4)

The first, second, . . . , fourth signals IP11, IP12, IP13, IP14 for the phase information sent through the connector unit 15 is input to the signal processing circuit 16, under the lighting control of the light sources 13a, 13b, 13c by an output control unit 18. The signal processing circuit 16 subjects the first, second, . . . , fourth signals IP11, IP12, IP13, IP14 to current/voltage (I/V) conversion, DC signal component subtraction and predetermined gain processing. The signal processing circuit 16 then outputs, from the output terminal, signals (A-phase analog signal, AB-phase analog signal, B-phase analog signal, BB-phase analog signal) for one of the three encoder heads 12a, 12b, 12c connected by the same phase information, for example, the phase 0°, 90°, 180°, 270°. The signal processing circuit 16 comprises a signal processing unit 17, the output control unit 18 and an LED driver 19.

The signal processing unit 17 includes I/V converters 17-1 to 17-4 connected onto lines for the first to fourth signals IP11, IP12, IP13, IP14, a first DC subtraction/gain circuit 17-5 connected to the output terminals of the I/V converters 17-1, 17-2 out of the I/V converters 17-1 to 17-4, a second DC subtraction/gain circuit 17-6 connected to the output terminals of the I/V converters 17-3, 17-4, a binarization/multiplication processing unit 17-7, and a parallel-serial signal conversion circuit 17-8.

The I/V converter 17-1 performs a current/voltage conversion of the first signal IP11. The I/V converter 17-2 performs a current/voltage conversion of the second signal IP12. The I/V converter 17-3 performs a current/voltage conversion of the third signal IP13. The I/V converter 17-4 performs a current/voltage conversion of the fourth signal IP14.

The first DC subtraction/gain circuit 17-5 subjects outputs of the I/V converters 17-1, 17-2 to DC signal component subtraction and predetermined gain processing. The second DC subtraction/gain circuit 17-6 subjects outputs of the I/V converters 17-3, 17-4 to DC signal component subtraction and predetermined gain processing.

The binarization/multiplication processing unit 17-7 converts, into binary signals at a predetermined threshold level, encoder analog signals output from the first and second DC subtraction/gain circuits 17-5, 17-6, that is, an A-phase analog signal AS1, an AB-phase analog signal AS2, a B-phase analog signal AS3 and a BB-phase analog signal AS4. The binarization/multiplication processing unit 17-7 also performs multiprocessing for further phase division to produce a high-resolution signal, and outputs encoder digital signals (an A-phase digital signal DS1, an AB-phase digital signal DS2, a B-phase digital signal DS3, a BB-phase digital signal DS4). The binarization/multiplication processing unit 17-7 may include a counter 17-9. The counter 17-9 uses the generated encoder digital signals (the A-phase digital signal DS1, the AB-phase digital signal DS2, the B-phase digital signal DS3, the BB-phase digital signal DS4) to perform counting for the encoder heads.

The parallel-serial signal conversion circuit 17-8 converts the generated encoder digital signals (the A-phase digital signal DS1, the AB-phase digital signal DS2, the B-phase digital signal DS3, the BB-phase digital signal DS4) into one signal output. The parallel-serial signal conversion circuit 17-8 converts the encoder analog signals, the encoder digital signals and a counter signal into a serial signal SI.

An output signal selection terminal R is connected to the output control unit 18. The output signal selection terminal R is a terminal for receiving a command issued from a control unit of an apparatus that uses the present encoder. The command issued from the control unit indicates, for example, which encoder to output a signal and which timing to output the signal. In response to the command issued from the control unit of the apparatus that uses the present encoder, the output control unit 18 controls to turn on one of the light sources 13a, 13b, 13c and send, to the signal processing circuit 16, one of the first, second, third and fourth signals IP11, IP12, IP13, IP14 corresponding to one light source 13a, 13b or 13c that is turned on.

Specifically, the output control unit 18 includes a processing control section 18-1 and a switch (SW) 18-2. The LED driver 19 is connected to the switch (SW) 18-2. The LED driver 19 drives the light sources 13a, 13b, 13c of the first to third encoder heads 12a, 12b, 12c.

The switch (SW) 18-2 connects the LED driver 19 and one of the light sources 13a, 13b, 13c of the first to third encoder heads 12a, 12b, 12c. The switch (SW) 18-2 includes terminals T1, T2, T3 connected to the light sources 13a, 13b, 13c. The terminal T1 is connected to the light source 13a. The terminal T2 is connected to the light source 13b. The terminal T3 is connected to the light source 13c. One of the terminals T1, T2, T3 is connected, and the LED driver 19 is connected to one of the light sources 13a, 13b, 13c, so that each of the light sources 13a, 13b, 13c is turned on and driven. The LED driver 19 passes a current through each of the light sources 13a, 13b, 13c to turn on each of the light sources 13a, 13b, 13c with predetermined intensity.

The processing control section 18-1 controls to repetitively and sequentially close the terminals T1, T2, T3 of the switch (SW) 18-2 at regular periods, and controls to repetitively and sequentially turn on and drive one of the light sources 13a, 13b, 13c of the first to third encoder heads 12a, 12b, 12c.

Thus, the light source 13a, 13b, 13c of one of the first to third encoder heads 12a, 12b, 12c only turns on. Even if a plurality of encoders detect displacements relative to the first to third scales 11a, 11b, 11c, the first, second, third or fourth signal IP11, IP12, IP13, IP14 (Equations (1) to (4)) output from one of the encoder heads 12a, 12b, 12c is input to the signal processing circuit 16.

Specifically, one of the light source 13a, 13b, 13c of the first to third encoder heads 12a, 12b, 12c is repetitively and sequentially turned on and driven by the processing control section 18-1 so that the current signals IPa11, IPb11, IPc11 are time-divisionally sent to the signal processing circuit 16 through the connector unit 15 in the case of the first signal IP11 shown in Equation (1). In the case of the second signal IP12 shown in Equation (2), the current signals IPa12, IPb12, IPc12 are time-divisionally sent to the signal processing circuit 16 through the connector unit 15. In the case of the third signal IP13 shown in Equation (3), the current signals IPa13, IPb13, IPc13 are time-divisionally sent to the signal processing circuit 16 through the connector unit 15. In the case of the fourth signal IP14 shown in Equation (4), the current signals IPa14, IPb14, IPc14 are time-divisionally sent to the signal processing circuit 16 through the connector unit 15.

Now, the operation of the encoder having the configuration described above is described.

When the first to third scales 11a, 11b, 11c and the first to third encoder heads 12a, 12b, 12c have been displaced relative to each other, respectively, the processing control section 18-1 repetitively and sequentially closes the terminals T1, T2, T3 of the switch (SW) 18-2 at regular periods. The switch (SW) 18-2 repetitively and sequentially closes between the LED driver 19 and one of the light sources 13a, 13b, 13c of the first to third encoder heads 12a, 12b, 12c at regular periods. The light sources 13a, 13b, 13c are sequentially and repetitively turned on and driven at regular periods.

Once lights are sequentially and repetitively emitted from the light sources 13a, 13b, 13c at regular periods, the lights are applied to the first to third scales 11a, 11b, 11c, and thereby reflected, diffracted and scattered and then again enter the first to third encoder heads 12a, 12b, 12c, respectively. The lights which have again entered the encoder heads change in amount due to relative displacement amounts of the first to third scales 11a, 11b, 11c and the first to third encoder heads 12a, 12b, 12c.

The photodetectors (PD) 14a1, 14a2, 14a3, 14a4 of the first encoder head 12a detect the amounts of the lights which have again entered the encoder heads. The photodetectors 14a1, 14a2, 14a3, 14a4 generate currents proportionate to these light amounts, and output current signals IPa11, IPa12, IPa13, IPa14 having phase information, respectively. The current signal IPa11 includes the phase information for a phase 0°. The current signal IPa12 includes the phase information for a phase 90°. The current signal IPa13 includes the phase information for a phase 180°. The current signal IPa14 includes the phase information for a phase 270°.

The photodetectors (PD) 14b1, 14b2, 14b3, 14b4 of the second encoder head 12b also detect the amounts of the lights which have again entered the encoder heads. The photodetectors 14b1, 14b2, 14b3, 14b4 generate currents proportionate to these light amounts, and output current signals IPb11, IPb12, IPb13, IPb14 having phase information, respectively. The current signal IPb11 includes the phase information for a phase 0°. The current signal IPb12 includes the phase information for a phase 90°. The current signal IPb13 includes the phase information for a phase 180°. The current signal IPb14 includes the phase information for a phase 270°.

The photodetectors (PD) 14c1, 14c2, 14c3, 14c4 of the third encoder head 12c also detect the amounts of the lights which have again entered the encoder heads. The photodetectors 14c1, 14c2, 14c3, 14c4 generate currents proportionate to these light amounts, and output current signals IPc11, IPc12, IPc13, IPc14 having phase information, respectively. The current signal IPc11 includes the phase information for a phase 0°. The current signal IPc12 includes the phase information for a phase 90°. The current signal IPc13 includes the phase information for a phase 180°. The current signal IPc14 includes the phase information for a phase 270°.

The connector unit 15 groups the current signals IPa11, IPa12, IPa13, IPa14 including the phase information output from the first encoder head 12a, the current signals IPb11, IPb12, IPb13, IPb14 including the phase information output from the second encoder head 12b, and the current signals IPc11, IPc12, IPc13, IPc14 including the phase information output from the third encoder head 12c, into current signals including the same phase information, for example, the phase 0°, 90°, 180°, 270°. Then, the connector unit 15 outputs the grouped current signals through separate lines.

For example, the connector unit 15 outputs a series of current signals IPa11, IPb11, IPc11 including the phase information for the phase 0° as the first signal IP11, as shown in Equation (1). The connector unit 15 then outputs a series of current signals IPa12, IPb12, IPc12 including the phase information for the phase 90° as the second signal IP12, as shown in Equation (2). The connector unit 15 then outputs a series of current signals IPa13, IPb13, IPc13 including the phase information for the phase 180° as the third signal IP13, as shown in Equation (3). The connector unit 15 then outputs a series of current signals IPa14, IPb14, IPc14 including the phase information for the phase 270° as the fourth signal IP14, as shown in Equation (4).

The first to fourth signals IP11, IP12, IP13, IP14 sent from the connector unit 15 are input to the signal processing circuit 16. The signal processing circuit 16 subjects the first to fourth signals IP11, IP12, IP13, IP14 to current/voltage (I/V) conversion, DC signal component subtraction and predetermined gain processing. The signal processing circuit 16 then outputs, from the output terminal, the encoder analog signals (the A-phase analog signal AS1, the AB-phase analog signal AS2, the B-phase analog signal AS3 and the BB-phase analog signal AS4) for one of the three encoder heads 12a, 12b, 12c connected by the same phase information, for example, the phase 0°, 90°, 180°, 270°.

The binarization/multiplication processing unit 17-7 converts, into binary signals at a predetermined threshold level, the encoder analog signals output from the first and second DC subtraction/gain circuits 17-5, 17-6, that is, the A-phase analog signal AS1, the AB-phase analog signal AS2, the B-phase analog signal AS3 and the BB-phase analog signal AS4. The binarization/multiplication processing unit 17-7 also performs multiprocessing for further phase division to produce a high-resolution signal, and outputs the encoder digital signals (the A-phase digital signal DS1, the AB-phase digital signal DS2, the B-phase digital signal DS3, the BB-phase digital signal DS4).

The counter 17-9 of the binarization/multiplication processing unit 17-7 uses the generated encoder digital signals (the A-phase digital signal DS1, the AB-phase digital signal DS2, the B-phase digital signal DS3, the BB-phase digital signal DS4) to perform counting for the encoder heads.

The parallel-serial signal conversion circuit 17-8 converts the generated encoder digital signals (the A-phase digital signal DS1, the AB-phase digital signal DS2, the B-phase digital signal DS3, the BB-phase digital signal DS4) into one signal output. The parallel-serial signal conversion circuit 17-8 converts the encoder analog signals, the encoder digital signals and the counter signal into the serial signal SI.

As described above, according to the second embodiment, the connector unit 15 is provided between the first to third encoder heads 12a, 12b, 12c and the signal processing circuit 16. The connector unit 15 groups the current signals IPa11, IPa12, IPa13, IPa14 including the phase information output from the first encoder head 12a, the current signals IPb11, IPb12, IPb13, IPb14 including the phase information output from the second encoder head 12b, and the current signals IPc11, IPc12, IPc13, IPc14 including the phase information output from the third encoder head 12c, into current signals including the same phase information, for example, the phase 0°, 90°, 180°, 270°. Then, the connector unit 15 outputs the grouped current signals through, for example, separate output line systems K in a serial state.

The number of wiring lines between the connector unit 15 and the signal processing circuit 16 can be smaller, and the degree of freedom in running the wiring lines can be ensured. In particular, a short distance is set between each of the first to third encoder heads 12a, 12b, 12c and the connector unit 15 to allow for a higher degree of freedom in running the wiring lines between the connector unit 15 and the signal processing circuit 16. For example, when three encoder heads, here, the first to third encoder heads 12a, 12b, 12c are provided, as many as 12 output line systems K, for example, have heretofore been needed to send the current signals for the phases 0°, 90°, 180°, 270° to the signal processing circuit 16 from each encoder head. However, when the present embodiment is used, the number of wiring lines can be reduced by, for example, four output line systems K.

On the other hand, the signal processing circuit 16 has only to sequentially process the current signals for, for example, the phases 0°, 90°, 180°, 270° time-divisionally sent from the first to third encoder heads 12a, 12b, 12c through the output line systems K. The I/V converters 17-1 to 17-4 and the first and second DC subtraction/gain circuits 17-5, 17-6 in the signal processing circuit 16 have only to be provided for one encoder head. Thus, the circuit configuration of the signal processing circuit 16 can be simpler. Conventionally, the I/V converters 17-1 to 17-4 and the first and second DC subtraction/gain circuits 17-5, 17-6 in the signal processing circuit 16 have to be provided for the number of provided encoder heads. Therefore, the circuit configuration is complicated and increased in size.

Each of the first to third encoder heads 12a, 12b, 12c only uses a small number of components mainly including the light sources 13a, 13b, 13c and the photodetectors (PD) 14a1, 14a2, ..., 14c4. Each of the first to third encoder heads 12a, 12b, 12c includes no components or circuits having a large area, and can therefore be significantly small in size. Each of the first to third encoder heads 12a, 12b, 12c can be freely configured in shape or size, and can ensure the degree of freedom in designing, which is suitable for a case where a plurality of encoders are needed in a small place.

From the perspective of wiring, the connector unit 15 enables wiring that is equivalent to connecting the first to third encoder heads 12a, 12b, 12c in series, so that the degree of freedom in running the wiring lines can be ensured.

Since the connector unit 15 is provided, the signal processing circuit 16 has only to have the number of input/output lines substantially suited to at least one encoder even if there are a plurality of encoder heads, for example, the first to third encoder heads 12a, 12b, 12c. This makes it possible to more effectively ensure the degree of freedom in the designing of the encoder. For the most effective use of the encoder, the outputs from the signal processing circuit 16 should be sent out by one signal output.

One signal processing circuit 16 is shown in FIG. 2. However, when a plurality of signal processing circuits 16 are needed, some of the functions of the signal processing circuit 16 can be suitably extracted and used in common so that the wiring lines for signal output can be further reduced.

Although three encoders are described in the present embodiment, the number of encoders is not limited. The encoder described in the present embodiment is an optical encoder for generating a two-phase encoder signal. An encoder having a different number of phases or a magnetic or capacitive encoder can also be adapted to transform signals output from the encoder into one signal, or connect the output signals of the encoders to produce one signal, or input and process one encoder signal.

Next, a third embodiment of the present invention is described with reference to the drawings. It is to be noted that the same components as those in FIG. 2 are provided with the same reference signs and are not described. First to third scales 21a to 21c and first to third encoder heads 22a to 22c are the same as the first to third scales 11a to 11c and the first to third encoder heads 12a to 12c in the first embodiment described above in terms of configuration, and merely have different reference signs.

Figure 3:
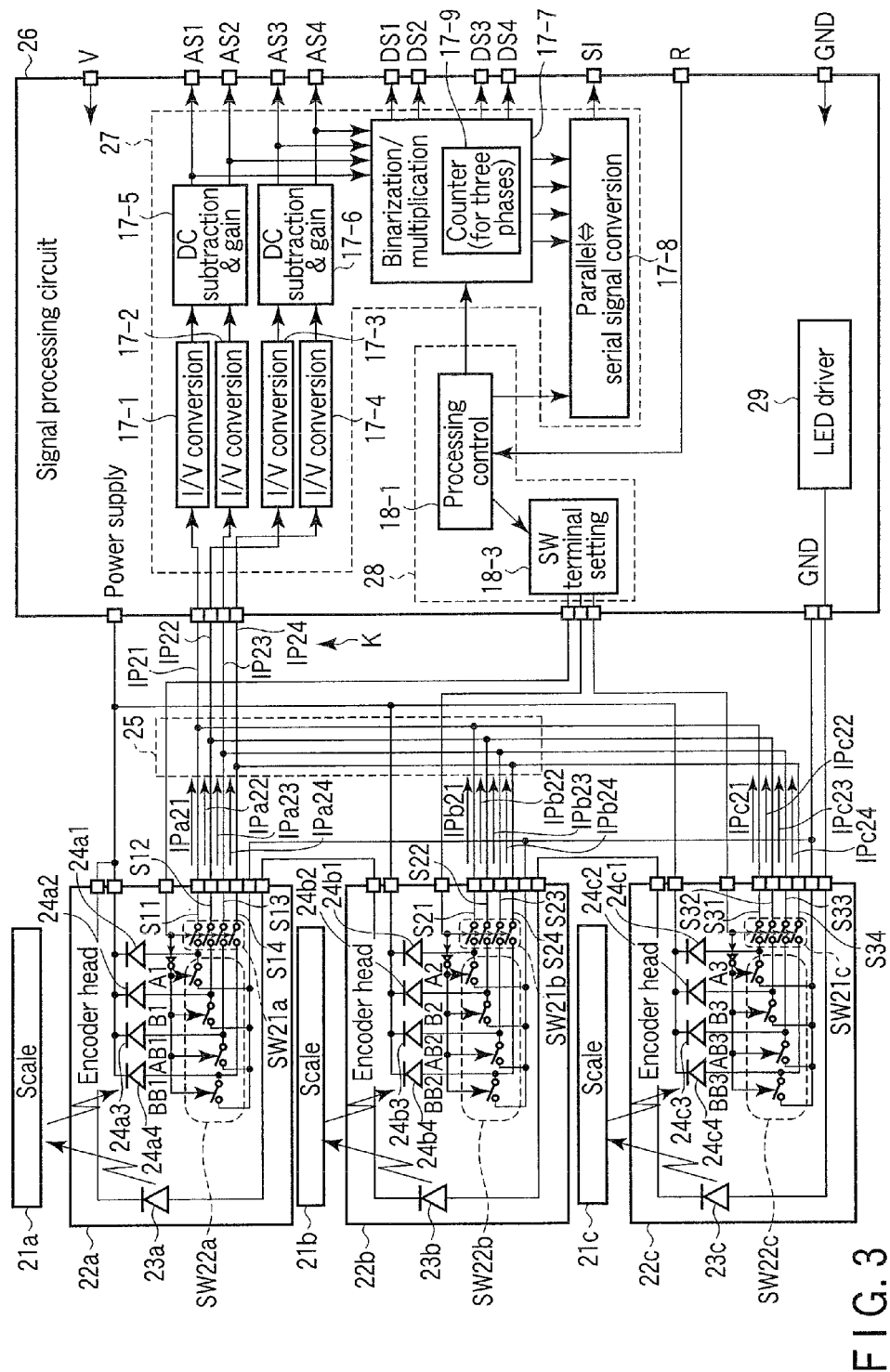
FIG. 3 is a configuration diagram showing a third embodiment of an encoder according to the present invention.

FIG. 3 shows a configuration diagram of an encoder. The first scale 21a and the first encoder head 22a are provided to face each other. The second scale 21b and the second encoder head 22b are provided to face each other. The third scale 21c and the third encoder head 22c are provided to face each other. The first scale 21a and the first encoder head 22a are displaced relative to each other. The second scale 21b and the second encoder head 22b are displaced relative to each other. The third scale 21c and the third encoder head 22c are displaced relative to each other.

The first to third encoder heads 22a, 22b, 22c are provided with light sources (including coherent light sources and slits for urging coherence) 23a, 23b, 23c comprising, for example, LEDs. The light sources 23a, 23b, 23c are connected in series.

An LED driver 29 passes a current through each of the light sources 23a, 23b, 23c connected in series, and simultaneously turns on each of the light sources 23a, 23b, 23c with predetermined intensity. As a result, the number of wiring lines for each of the light sources 23a, 23b, 23c is reduced. When the voltage of a power source V should be lower, the light sources 23a, 23b, 23c may be driven by separate LED drivers.

The first encoder head 22a includes, for example, the light source 23a, four photodetectors (PD) 24a1, 24a2, 24a3, 24a4, a first switch SW21a and a second switch SW22a.

The photodetectors 24a1, 24a2, 24a3, 24a4 receive displacement signals different in phase information 90 degrees from one another. The photodetectors 24a1, 24a2, 24a3, 24a4 detect the amounts of the lights that have entered. The photodetectors 24a1, 24a2, 24a3, 24a4 generate currents proportionate to these light amounts, and output current signals IPa21, IPa22, IPa23, IPa24 having phase information, for example, phases 0°, 90°, 180°, 270°, respectively.

As the three light sources 23a, 23b, 23c simultaneously turn on, the first switch SW21a and the second switch SW22a are switched so that all the current signals from the three encoder heads 22a, 22b, 22c may not be passed through a signal processing circuit 26.

The first switch SW21a is switched so that the current signals IPa21, IPa22, IPa23, IPa24 generated by the photodetectors 24a1, 24a2, 24a3, 24a4 may be output or may not be output from the first encoder head 22a. The first switch SW21a includes, for example, four switches S11, S12, S13, S14 connected to four lines for the phases 0°, 90°, 180°, 270° in an output line system K. The switches S11, S12, S13, S14 simultaneously turn on and off.

The second switch SW22a includes, for example, four switches A1, B1, AB1, BB1 corresponding to the photodetectors 24a1, 24a2, 24a3, 24a4. The switches A1, B1, AB1, BB1 are connected on one end to the photodetectors 24a1, 24a2, 24a3, 24a4, and connected on the other end to a common ground (GND). The switches A1, B1, AB1, BB1 simultaneously turn on and off.

The switches S11, S12, S13, S14 of the first switch SW21a and the switches A1, B1, AB1, BB1 of the second switch SW22a are exclusively switched on or off. For example, when the switches S11, S12, S13, S14 of the first switch SW21a are on, the switches A1, B1, AB1, BB1 of the second switch SW22a are off. In this case, the current signals IPa21, IPa22, IPa23, IPa24 including the phase information, for example, the phases 0°, 90°, 180°, 270° generated by the photodetectors 24a1, 24a2, 24a3, 24a4 are output from the first encoder head 22a through the switches S11, S12, S13, S14 of the first switch SW21a, respectively.

On the other hand, when the switches S11, S12, S13, S14 of the first switch SW21a are off, the switches A1, B1, AB1, BB1 of the second switch SW22a are on. In this case, the current signals generated by the photodetectors 24a1, 24a2, 24a3, 24a4 and unnecessary currents originating from external light and dark currents flow to the ground (GND).

The second encoder head 22b includes, for example, the light source 23b, four photodetectors (PD) 24b1, 24b2, 24b3, 24b4, a first switch SW21b and a second switch SW22b.

The photodetectors 24b1, 24b2, 24b3, 24b4 receive displacement signals different in phase information 90 degrees from one another. The photodetectors 24b1, 24b2, 24b3, 24b4 detect the amounts of the lights that have entered. The photodetectors 24b1, 24b2, 24b3, 24b4 generate currents proportionate to these light amounts, and output current signals IPb21, IPb22, IPb23, IPb24 having phase information, for example, phases 0°, 90°, 180°, 270°, respectively.

As the three light sources 23a, 23b, 23c simultaneously turn on, the first switch SW21b and the second switch SW22b are switched so that all the current signals from the three encoder heads 22a, 22b, 22c may not flow into the signal processing circuit 26.

The first switch SW21b is switched so that the current signals IPb21, IPb22, IPb23, IPb24 generated by the photodetectors 24b1, 24b2, 24b3, 24b4 may be output or may not be output from the second encoder head 22b. The first switch SW21b includes, for example, four switches S21, S22, S23, S24 connected to the four lines for the phases 0°, 90°, 180°, 270° in the output line system K. The switches S21, S22, S23, S24 simultaneously turn on and off.

The second switch SW22b includes four switches A2, B2, AB2, BB2 corresponding to the photodetectors 24b1, 24b2, 24b3, 24b4. The switches A2, B2, AB2, BB2 are connected on one end to the photodetectors 24b1, 24b2, 24b3, 24b4, and connected on the other end to a common ground (GND). The switches A2, B2, AB2, BB2 simultaneously turn on and off.

The switches S21, S22, S23, S24 of the first switch SW21b and the switches A2, B2, AB2, BB2 of the second switch SW22b are exclusively switched on or off. For example, when the switches S21, S22, S23, S24 of the first switch SW21b are on, the switches A2, B2, AB2, BB2 of the second switch SW22b are off. In this case, the current signals IPb21, IPb22, IPb23, IPb24 including the phase information, for example, the phases 0°, 90°, 180°, 270° generated by the photodetectors 24b1, 24b2, 24b3, 24b4 are output from the second encoder head 22b through the switches S21, S22, S23, S24 of the first switch SW21b, respectively.

On the other hand, when the switches S21, S22, S23, S24 of the first switch SW21b are off, the switches A2, B2, AB2, BB2 of the second switch SW22b are on. In this case, the current signals generated by the photodetectors 24b1, 24b2, 24b3, 24b4 and unnecessary currents originating from external light and dark currents flow to the ground (GND).

The third encoder head 22c includes, for example, the light source 23c, four photodetectors (PD) 24c1, 24c2, 24c3, 24c4, a first switch SW21c and a second switch SW22c.

The photodetectors 24c1, 24c2, 24c3, 24c4 receive displacement signals different in phase information 90 degrees from one another. The photodetectors 24c1, 24c2, 24c3, 24c4 detect the amounts of the lights that have entered. The photodetectors 24c1, 24c2, 24c3, 24c4 generate currents proportionate to these light amounts, and output current signals IPc21, IPc22, IPc23, IPc24 having phase information, for example, phases 0°, 90°, 180°, 270°, respectively.

As the three light sources 23a, 23b, 23c simultaneously turn on, the first switch SW21c and the second switch SW22c are switched so that all the current signals from the three encoder heads 22a, 22b, 22c may not flow into the signal processing circuit 26.

The first switch SW21c is switched so that the current signals IPc21, IPc22, IPc23, IPc24 generated by the photodetectors 24c1, 24c2, 24c3, 24c4 may be output or may not be output from the third encoder head 22c. The first switch SW21c includes, for example, four switches S31, S32, S33, S34 connected to the four lines for the phases 0°, 90°, 180°, 270° in the output line system K. The switches S31, S32, S33, S34 simultaneously turn on and off.

The second switch SW22c includes four switches A3, B3, AB3, BB3 corresponding to the photodetectors 24c1, 24c2, 24c3, 24c4. The switches A3, B3, AB3, BB3 are connected on one end to the photodetectors 24c1, 24c2, 24c3, 24c4, and connected on the other end to a common ground (GND). The switches A3, B3, AB3, BB3 simultaneously turn on and off.

The switches S31, S32, S33, S34 of the first switch SW21c and the switches A3, B3, AB3, BB3 of the second switch SW22c are exclusively switched on or off. For example, when the switches S31, S32, S33, S34 of the first switch SW21c are on, the switches A3, B3, AB3, BB3 of the second switch SW22c are off. In this case, the current signals IPc21, IPc22, IPc23, IPc24 including the phase information, for example, the phases 0°, 90°, 180°, 270° generated by the photodetectors 24c1, 24c2, 24c3, 24c4 are output from the third encoder head 22c through the switches S31, S32, S33, S34 of the first switch SW21c, respectively.

On the other hand, when the switches S31, S32, S33, S34 of the first switch SW21c are off, the switches A3, B3, AB3, BB3 of the second switch SW22c are on. In this case, the current signals generated by the photodetectors 24c1, 24c2, 24c3, 24c4 and unnecessary currents originating from external light and dark currents flow to the ground (GND).

A connector unit 25 groups the current signals IPa21, IPa22, IPa23, IPa24 including the phase information output from the first encoder head 22a, for example, the phases 0°, 90°, 180°, 270°, the current signals IPb21, IPb22, IPb23, IPb24 including the phase information output from the second encoder head 22b, for example, the phases 0°, 90°, 180°, 270°, and the current signals IPc21, IPc22, IPc23, IPc24 including the phase information output from the third encoder head 22c, for example, the phases 0°, 90°, 180°, 270°, into current signals including the same phase information, for example, the phase 0°, 90°, 180°, 270°. Then, the connector unit 25 time-divisionally outputs the grouped current signals through separate output line systems K. The output line systems K include, for example, four lines for 0°, 90°, 180°, 270°.

The connector unit 25 connects together the photodetectors which output the current signals having the same phase information in the first to third encoder heads 22a to 22c, for example, the photodetectors 24a1, 24b1, 24c1 corresponding to the phase information for the phase 0°. The connector unit 25 connects together the photodetectors 24a2, 24b2, 24c2 corresponding to the phase information for the phase 90°. The connector unit 25 connects together the photodetectors 24a3, 24b3, 24c3 corresponding to the phase information for the phase 180°. The connector unit 25 connects together the photodetectors 24a4, 24b4, 24c4 corresponding to the phase information for the phase 270°.

The connector unit 25 outputs the current signals IPa21, IPb21, IPc21 including the phase information for the phase 0° as a first signal IP21. Similarly, the connector unit 25 outputs the current signals IPa22, IPb22, IPc22 including the phase information for the phase 90° as a second signal IP22. The connector unit 25 outputs the current signals IPa23, IPb23, IPc23 including the phase information for the phase 180° as a third signal IP23. The connector unit 25 outputs the current signals IPa24, IPb524, IPc24 including the phase information for the phase 270° as a fourth signal 1224.

The outputs of the connector unit 25 are:

$$\text{First signal } IP21 = IPa21 + IPb21 + IPc21 \quad (5)$$

$$\text{Second signal } IP22 = IPa22 + IPb22 + IPc22 \quad (6)$$

$$\text{Third signal } IP23 = IPa23 + IPb23 + IPc23 \quad (7)$$

$$\text{Fourth signal } IP24 = IPa24 + IPb24 + IPc24 \quad (8)$$

The first to fourth signals IP21, IP22, IP23, IP24 from the connector unit 25 are input to the signal processing circuit 26.

The signal processing circuit 26 subjects the first to fourth signals IP21, IP22, IP23, IP24 to current/voltage (I/V) conversion, DC signal component subtraction and predetermined gain processing. The signal processing circuit 26 then outputs encoder analog signals (an A-phase analog signal AS1, an AB-phase analog signal AS2, a B-phase analog signal AS3, a BB-phase analog signal AS4) for one of the three encoder heads 22a, 22b, 22c connected by the same phase information, for example, the phase 0°, 90°, 180°, 270°. The signal processing circuit 26 comprises a signal processing unit 27, an output control unit 28 and the LED driver 29. The signal processing unit 27, the output control unit 28 and the LED driver 29 are the same as the signal processing unit 17, the output control unit 18 and the LED driver 19.

Receiving, through an output signal selection terminal R, a command issued from a control unit of an apparatus that uses the present encoder, the output control unit 28 controls to only input sequentially, to the signal processing circuit 26, the signals output from one of the first, second and third encoder heads 22a, 22b, 22c corresponding to the three light sources 23a, 23b, 23c that are on at the same time.

Specifically, the output control unit 28 includes a processing control section 18-1 and a switch (SW) terminal setting section 18-3. In response to the command from the processing control section 18-1, the switch (SW) terminal setting section 18-3 sets the first switches SW21a, SW21b, SW21c and the second switches SW22a, SW22b, SW22c in the first to third encoder heads 22a, 22b, 22c to turn on or off in accordance with the command.

In accordance with the setting for the switch (SW) terminal setting section 18-3, the processing control section 18-1 controls the first switches SW21a, SW21b, SW21c and the second switches SW22a, SW22b, SW22c in the first to third encoder heads 22a, 22b, 22c to turn on or off as follows:

The processing control section 18-1 alternately switches on or off the first switch SW21a and the second switch SW22a in the first encoder head 22a. The processing control section 18-1 alternately switches on or off the first switch SW21b and the second switch SW22b in the second encoder head 22b. The processing control section 18-1 alternately switches on or off the first switch SW21c and the second switch SW22c in the third encoder head 22c.

Specifically, the processing control section 18-1 simultaneously turns on the switches S11, S12, S13, S14 in the first switch SW21a of the first encoder head 22a, and simultaneously turns off the switches A1, B1, AB1, BB1 in the second switch SW22a. Also, the processing control section 18-1 simultaneously turns off the switches S11, S12, S13, S14 in the first switch SW21a, and simultaneously turns on the switches A1, B1, AB1, BB1 in the second switch SW22a.

The processing control section 18-1 simultaneously turns on the switches S11, S12, S13, S14 in the first switch SW21a of the first encoder head 22a, and simultaneously turns off the switches A1, B1, AB1, BB1 in the second switch SW22a. In this case, the processing control section 18-1 simultaneously turns off the switches S21, S22, S23, S24 in the first switch SW21b of the second encoder head 22b other than the first encoder head 22a, and simultaneously turns on the switches A2, B2, AB2, BB2 in the second switch SW22b. Also, the processing control section 18-1 simultaneously turns off the switches S31, S32, S33, S34 in the first switch SW21c of the third encoder head 22c, and simultaneously turns on the switches A3, B3, AB3, BB3 in the second switch SW22c.

The current signals generated by the photodetectors 24b1, 24b2, 24b3, 24b4 in the second encoder head 22b and unnecessary currents originating from external light and dark currents flow to the ground (GND). Also, the current signals generated by the photodetectors 24c1, 24c2, 24c3, 24c4 in the third encoder head 22c and unnecessary currents originating from external light and dark currents flow to the ground (GND).

The processing control section 18-1 simultaneously turns on the switches S21, S22, S23, S24 in the first switch SW21b of the second encoder head 22b, and simultaneously turns off the switches A2, B2, AB2, BB2 in the second switch SW22b. Also, the processing control section 18-1 simultaneously turns off the switches S21, S22, S23, S24 in the first switch SW21b, and simultaneously turns on the switches A2, B2, AB2, BB2 in the second switch SW22b.

The processing control section 18-1 simultaneously turns on the switches S21, S22, S23, S24 in the first switch SW21b of the second encoder head 22b, and simultaneously turns off the switches A2, B2, AB2, BB2 in the second switch SW22b. In this case, the processing control section 18-1 simultaneously turns off the switches S11, S12, S13, S14 in the first switch SW21a of the first encoder head 22a other than the second encoder head 22b, and simultaneously turns on the switches A1, B1, AB1, BB1 in the second switch SW22a. Also, the processing control section 18-1 simultaneously turns off the switches S31, S32, S33, S34 in the first switch SW21c of the third encoder head 22c, and simultaneously turns on the switches A3, B3, AB3, BB3 in the second switch SW22c.

The current signals generated by the photodetectors 24a1, 24a2, 24a3, 24a4 in the first encoder head 22a and unnecessary currents originating from external light and dark currents flow to the ground (GND). Also, the current signals generated by the photodetectors 24c1, 24c2, 24c3, 24c4 in the third encoder head 22c and unnecessary currents originating from external light and dark currents flow to the ground (GND).

The processing control section 18-1 simultaneously turns on the switches S31, S32, S33, S34 in the first switch SW21c of the third encoder head 22c, and simultaneously turns off the switches A3, B3, AB3, BB3 in the second switch SW22c. In this case, the processing control section 18-1 simultaneously turns off the switches S11, S12, S13, S14 in the first switch SW21a of the first encoder head 22a other than the third encoder head 22c, and simultaneously turns on the switches A1, B1, AB1, BB1 in the second switch SW22a. Also, the processing control section 18-1 simultaneously turns off the switches S21, S22, S23, S24 in the first switch SW21b of the second encoder head 22b, and simultaneously turns on the switches A2, B2, AB2, BB2 in the second switch SW22b.

The current signals generated by the photodetectors 24a1, 24a2, 24a3, 24a4 in the first encoder head 22a and unnecessary currents originating from external light and dark currents flow to the ground (GND). Also, the current signals generated by the photodetectors 24b1, 24b2, 24b3, 24b4 in the second encoder head 22b and unnecessary currents originating from external light and dark currents flow to the ground (GND).

Receiving, through the output signal selection terminal R, a command issued from the control unit of the apparatus that uses the present encoder, the processing control section 18-1 controls the binarization/multiplication processing unit 17-7 and the parallel-serial signal conversion circuit 17-8 synchronously with the on/off of the first switches SW21a, SW21b, SW21c and the second switches SW22a, SW22b, SW22c in the first to third encoder heads 22a, 22b, 22c to output the encoder analog signals (the A-phase analog signal AS1, the AB-phase analog signal AS2, the B-phase analog signal AS3, the BB-phase analog signal AS4) for one of the first to third encoder heads 22a, 22b, 22c.

Now, the operation of the encoder having the configuration described above is described.

The light sources 23a, 23b, 23c in the first to third encoder heads 22a, 22b, 22c are connected in series and simultaneously turn on.

In this condition, when the first to third scales 21a, 21b, 21c and the first to third encoder heads 22a, 22b, 22c have been displaced relative to each other, respectively, the processing control section 18-1 controls the first switches SW21a, SW21b, SW21c and the second switches SW22a, SW22b, SW22c in the first to third encoder heads 22a, 22b, 22c to turn on or off in accordance with the setting for the switch (SW) terminal setting section 18-3.

For example, first, the processing control section 18-1 simultaneously turns on the switches S11, S12, S13, S14 in the first switch SW21a of the first encoder head 22a, and simultaneously turns off the switches A1, B1, AB1, BB1 in the second switch SW22a. The current signals IPa21, IPa22, IPa23, IPa24 including the phase information for the phases 0°, 90°, 180°, 270° generated by the photodetectors 24a1, 24a2, 24a3, 24a4 in the first encoder head 22a flow to the connector unit 25 through the switches S11, S12, S13, S14 of the first switch SW21a, respectively.

The connector unit 25 sends the current signals IPa21, IPa22, IPa23, IPa24 including the phase information for the phases 0°, 90°, 180°, 270° output from the first encoder head 22a to the signal processing circuit 26 through the four lines for the phases 0°, 90°, 180°, 270° in the output line system K.

In this case, the processing control section 18-1 simultaneously turns off the switches S21, S22, S23, S24 in the first switch SW21b of the second encoder head 22b other than the first encoder head 22a, and simultaneously turns on the switches A2, B2, AB2, BB2 in the second switch SW22b. Also, the processing control section 18-1 simultaneously turns off the switches S31, S32, S33, S34 in the first switch SW21c of the third encoder head 22c, and simultaneously turns on the switches A3, B3, AB3, BB3 in the second switch SW22c.

The current signals generated by the photodetectors 24b1, 24b2, 24b3, 24b4 in the second encoder head 22b and unnecessary currents originating from external light and dark currents flow to the ground (GND). Also, the current signals generated by the photodetectors 24c1, 24c2, 24c3, 24c4 in the third encoder head 22c and unnecessary currents originating from external light and dark currents flow to the ground (GND).

The processing control section 18-1 then simultaneously turns on the switches S21, S22, S23, S24 in the first switch SW21b of the second encoder head 22b, and simultaneously turns off the switches A2, B2, AB2, BB2 in the second switch SW22b. The current signals IPb21, IPb22, IPb23, IPb24 including the phase information for the phases 0°, 90°, 180°, 270° generated by the photodetectors 24b1, 24b2, 24b3, 24b4 in the second encoder head 22b flow to the connector unit 25 through the switches S21, S22, S23, S24 in the first switch SW21b.

The connector unit 25 sends the current signals IPb21, IPb22, IPb23, IPb24 including the phase information for the phases 0°, 90°, 180°, 270° output from the second encoder head 22b to the signal processing circuit 26 through the four lines for the phases 0°, 90°, 180°, 270° in the output line system K.

In this case, the processing control section 18-1 simultaneously turns off the switches S11, S12, S13, S14 in the first switch SW21a of the first encoder head 22a other than the second encoder head 22b, and simultaneously turns on the switches A1, B1, AB1, BB1 in the second switch SW22a. Also, the processing control section 18-1 simultaneously turns off the switches S31, S32, S33, S34 in the first switch SW21c of the third encoder head 22c, and simultaneously turns on the switches A3, B3, AB3, BB3 in the second switch SW22c.

The current signals generated by the photodetectors 24a1, 24a2, 24a3, 24a4 in the first encoder head 22a and unnecessary currents originating from external light and dark currents flow to the ground (GND). Also, the current signals generated by the photodetectors 24c1, 24c2, 24c3, 24c4 in the third encoder head 22c and unnecessary currents originating from external light and dark currents flow to the ground (GND).

The processing control section 18-1 then simultaneously turns on the switches S31, S32, S33, S34 in the first switch SW21c of the third encoder head 22c, and simultaneously turns off the switches A3, B3, AB3, BB3 in the second switch SW22c. The current signals IPc21, IPc22, IPc23, IPc24 including the phase information for the phases 0°, 90°, 180°, 270° generated by the photodetectors 24c1, 24c2, 24c3, 24c4 in the third encoder head 22c flow to the connector unit 25 through the switches S31, S32, S33, S34 in the first switch SW21c.

The connector unit 25 sends the current signals IPc21, IPc22, IPc23, IPc24 including the phase information for the phases 0°, 90°, 180°, 270° output from the third encoder head 22c to the signal processing circuit 26 through the four lines for the phases 0°, 90°, 180°, 270° in the output line system K.

In this case, the processing control section 18-1 simultaneously turns off the switches S21, S22, S23, S24 in the first switch SW21b of the second encoder head 22b other than the third encoder head 22c, and simultaneously turns on the switches A2, B2, AB2, BB2 in the second switch SW22b. Also, the processing control section 18-1 simultaneously turns off the switches S21, S22, S23, S24 in the first switch SW21b of the second encoder head 22b, and simultaneously turns on the switches A2, B2, AB2, BB2 in the second switch SW22b.

The current signals generated by the photodetectors 24a1, 24a2, 24a3, 24a4 in the first encoder head 22a and unnecessary currents originating from external light and dark currents flow to the ground (GND). Also, the current signals generated by the photodetectors 24b1, 24b2, 24b3, 24b4 in the second encoder head 22b and unnecessary currents originating from external light and dark currents flow to the ground (GND).

As in the manner described above, the processing control section 18-1 repeats sequentially and simultaneously turning on the switches S11, S12, . . . , S34 in the first switches SW21a, SW21b, SW21c of the first, second and third encoder heads 22a, 22b, 22c. The first to fourth signals IP21, IP22, IP23, IP24 shown in Equations (5) to (8) are sent to the signal processing circuit 26 from the first, second and third encoder heads 22a, 22b, 22c through the connector unit 25.

The first to fourth signals IP21, IP22, IP23, IP24 sent from the connector unit 25 are sequentially input to the signal processing circuit 26. The signal processing circuit 26 subjects the first to fourth signals IP21, IP22, IP23, IP24 to current/voltage (I/V) conversion, DC signal component subtraction and predetermined gain processing. The signal processing circuit 26 then outputs the signals (the A-phase analog signal AS1, the AB-phase analog signal AS2, the B-phase analog signal AS3, the BB-phase analog signal AS4) for one of the three encoder heads 22a, 22b, 22c connected by the same phase information, for example, the phase 0°, 90°, 180°, 270°.

Receiving, through the output signal selection terminal, a command issued from the control unit of the apparatus that uses the present encoder, the processing control section 18-1 of the signal processing circuit 26 controls the binarization/multiplication processing unit 17-7 and the parallel-serial signal conversion circuit 17-8 synchronously with the on/off of the first switches SW21a, SW21b, SW21c and the second switches SW22a, SW22b, SW22c in the first to third encoder heads 22a, 22b, 22c to output the signals (the A-phase analog signal AS1, the AB-phase analog signal AS2, the B-phase analog signal AS3, the BB-phase analog signal AS4) for one of the first to third encoder heads 22a, 22b, 22c.

The binarization/multiplication processing unit 17-7 converts, into binary signals at a predetermined threshold level, the analog signals output from the first and second DC subtraction/gain circuits 17-5, 17-6, that is, the A-phase analog signal AS1, the AB-phase analog signal AS2, the B-phase analog signal AS3 and the BB-phase analog signal AS4. The binarization/multiplication processing unit 17-7 also performs multiprocessing for further phase division to produce a high-resolution signal, and outputs digital signals (the A-phase digital signal DS1, the AB-phase digital signal DS2, the B-phase digital signal DS3, the BB-phase digital signal DS4).

The counter 17-9 of the binarization/multiplication processing unit 17-7 uses the generated digital signals (the A-phase digital signal DS1, the AB-phase digital signal DS2, the B-phase digital signal DS3, the BB-phase digital signal DS4) to perform counting for the encoder heads.

The parallel-serial signal conversion circuit 17-8 converts the generated digital signals (the A-phase digital signal DS1, the AB-phase digital signal DS2, the B-phase digital signal DS3, the BB-phase digital signal DS4) into one signal output. The parallel-serial signal conversion circuit 17-8 converts the analog signals, the digital signals and a counter signal into the serial signal SI.

As described above, according to the third embodiment, the light sources 23a, 23b, 23c in the first to third encoder heads 22a, 22b, 22c are simultaneously turned on, and the first switch SW21a and the second switch SW22a are turned on or off so that all the current signals from the first to third encoder heads 22a, 22b, 22c may not flow into the signal processing circuit 26. The connector unit 25 groups the current signals IPa21, IPa22, IPa23, IPa24 including the phase information output from the first encoder head 22a, the current signals IPb21, IPb22, IPb23, IPb24 including the phase information output from the second encoder head 22b, and the current signals IPc21, IPc22, IPc23, IPc24 including the phase information output from the third encoder head 22c, into current signals including the same phase information, for example, the phase 0°, 90°, 180°, 270°. Then, the connector unit 25 outputs the grouped current signals through separate output line systems K.

The number of wiring lines between the connector unit 25 and the signal processing circuit 26 can be smaller, and the degree of freedom in running the wiring lines can be ensured. In particular, a short distance is set between each of the first to third encoder heads 22a, 22b, 22c and the connector unit 25 to allow for a higher degree of freedom in running the wiring lines between the connector unit 25 and the signal processing circuit 26.

Each of the first to third encoder heads 22a, 22b, 22c only uses a small number of components including the light sources 23a, 23b, 23c and the photodetectors (PD) 24a1, 24a2, 24c4. Each of the first to third encoder heads 22a, 22b, 22c includes no components or circuits having a large area, and can therefore be significantly small in size. Each of the first to third encoder heads 22a, 22b, 22c can be freely configured in shape or size, and can ensure the degree of freedom in designing, which is suitable for a case where a plurality of encoders are needed in a small place.

From the perspective of wiring, the connector unit 25 enables wiring that is equivalent to connecting the first to third encoder heads 22a, 22b, 22c in series, so that the degree of freedom in running the wiring lines can be ensured.

Since the connector unit 25 is provided, the signal processing circuit 26 has only to have the number of input/output lines substantially suited to at least one encoder even if there are a plurality of encoder heads, for example, the first to third encoder heads 22a, 22b, 22c. This makes it possible to more effectively ensure the degree of freedom in the designing of the encoder. For the most effective use of the encoder, the outputs from the signal processing circuit 26 should be sent out by a signal output for one encoder head.

As in the second embodiment described above, when, for example, three encoder heads, here, the first to third encoder heads 22a, 22b, 22c are provided, 12 output line systems K, for example, have heretofore been needed to send the current signals for the phases 0°, 90°, 180°, 270° to the signal processing circuit 26 from each encoder head. However, when the present embodiment is used, the number of wiring lines can be reduced by, for example, four output line systems K.

The signal processing circuit 26 has only to sequentially process, for example, the current signals for the phases 0°, 90°, 180°, 270° sent from the first to third encoder heads 22a, 22b, 22c through the output line systems K. The I/V converters 17-1 to 17-4 and the first and second DC subtraction/gain circuits 17-5, 17-6 in the signal processing circuit 26 have only to be provided for one encoder head. Thus, the circuit configuration of the signal processing circuit 26 can be simpler. Conventionally, the I/V converters 17-1 to 17-4 and the first and second DC subtraction/gain circuits 17-5, 17-6 in the signal processing circuit 26 have to be provided for the number of provided encoder heads. Therefore, the circuit configuration is complicated and increased in size.

One signal processing circuit 26 is shown in FIG. 3. However, when a plurality of signal processing circuits 26 are needed, some of the functions of the signal processing circuit 26 can be suitably extracted and used in common so that the wiring lines for signal output can be further reduced.

The processing control section 18-1 controls, for example, the first encoder head 22a among the first to third encoder heads 22a, 22b, 22c to send one of the current signals IPa21, IPa22, IPa23, IPa24 to the signal processing circuit 26 in the following manner: For the other second encoder head 22b, the processing control section 18-1 turns off all the switches S21 to S24 of the first switch SW21b, and turns on all the switches A2, B2, AB2, BB2 of the second switch SW22b. For the third encoder head 22c, the processing control section 18-1 turns off all the switches S31 to S34 of the first switch SW21c, and turns on all the switches A3, B3, AB3, BB3 of the second switch SW22c. Under this control, the current signals generated by the photodetectors 24b1, 24b2, 24c4 of the second and third encoder heads 22b and 22c and unnecessary currents originating from external light and dark currents can be passed to the ground (GND).

Although three encoders are described in the present embodiment, the number of encoders is not limited. The encoder described in the present embodiment is an optical encoder for generating a two-phase encoder signal. An encoder having a different number of phases or a magnetic or capacitive encoder can also be adapted to transform signals output from the encoder into one signal, or connect the output signals of the encoders to produce one signal, or input and process one encoder signal.

When N (N=2 or more) encoder heads are used, the output lines of the N encoder heads may be connected by the number of output lines for one encoder head or one of N−1 encoder heads. For example, when the three first to third encoder heads 22a, 22b, 22c are used as in the embodiments described above, the number of the output line systems K is not limited to four but may be eight. For example, the output lines of the first and second encoder heads 22a, 22b are connected together by the connector unit 25, while the output line of the third encoder head 22c may be directly connected to the signal processing circuits 26 without passing through the connector unit 25. This can be applied to, for example, a case where the output of the third encoder head 22c should be individually measured.

The first to third encoder heads 22a, 22b, 22c can otherwise be configured so that the photodetectors which output the current signals for the same kind of phase information, for example, the phase 0°, 90°, 180°, 270° are connected together in the same encoder head to provide one photodetector (PD) for each phase. For example, a plurality of photodetectors 24a1, 24a1, . . . , 24a1 corresponding to the phase 0° are provided in the first encoder head 22a, and these photodetectors 24a1, 24a1, . . . , 24a1 are connected to configure one photodetector (PD).

Next, a fourth embodiment of the present invention is described with reference to the drawings. It is to be noted that the same components as those in FIG. 3 are provided with the same reference signs and are not described. First to third scales 31a to 31c and first to third encoder heads 32a to 32c are the same as the first to third scales 21a to 21c and the first to third encoder heads 22a to 22c in the second embodiment described above in terms of configuration, and merely have different reference signs.

Figure 4:
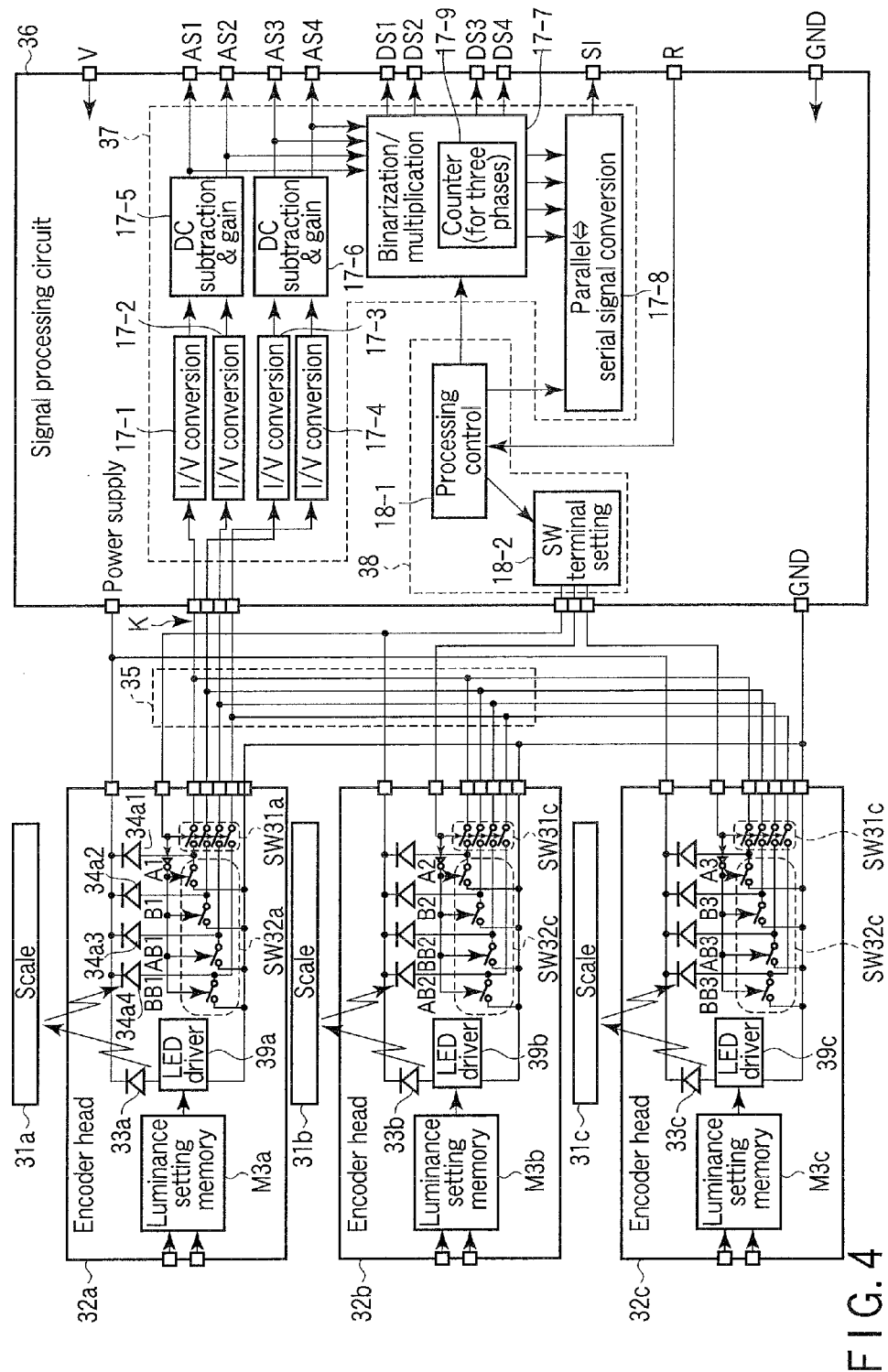
FIG. 4 is a configuration diagram showing a fourth embodiment of an encoder according to the present invention.
Figure 6:
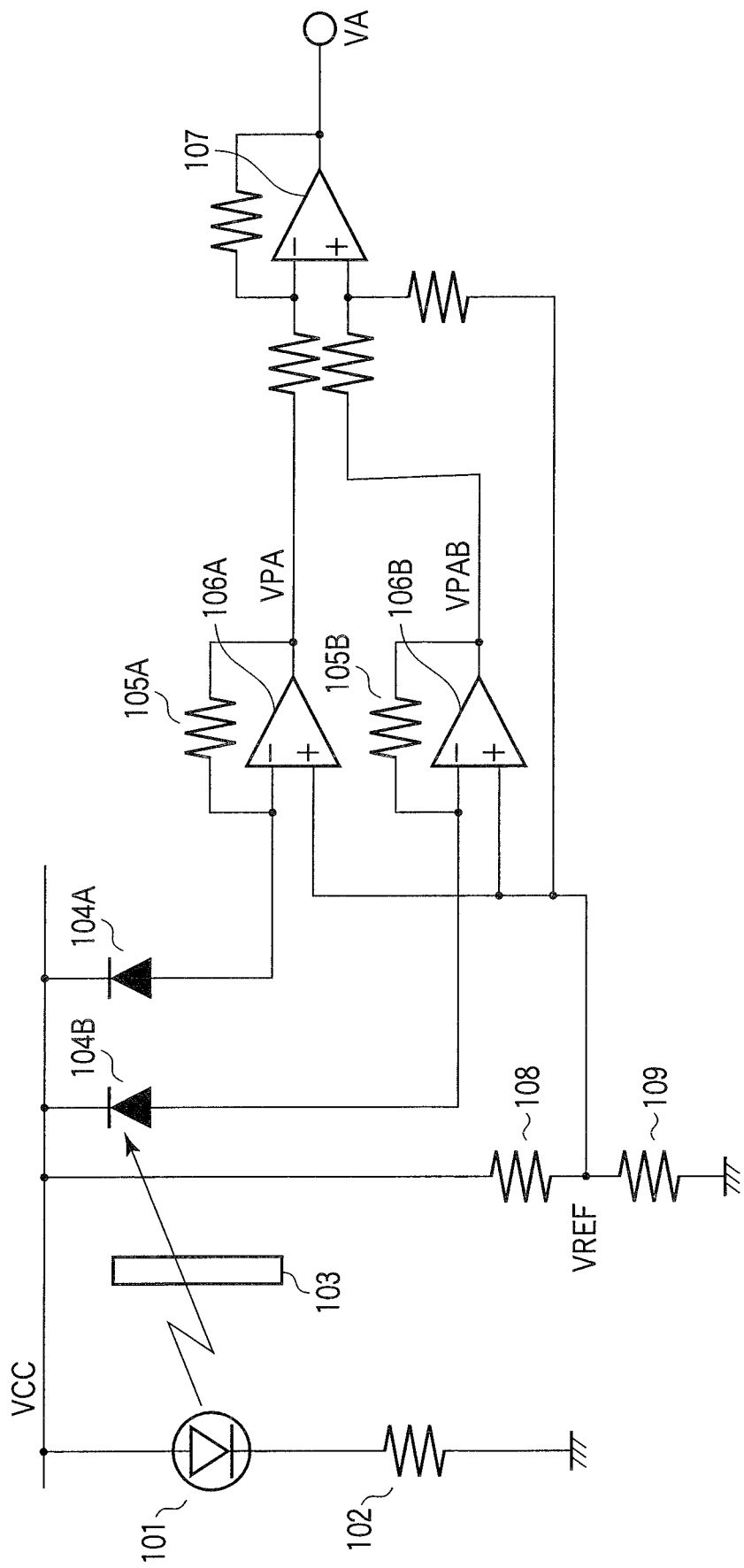
FIG. 6 is a configuration diagram showing a conventional encoder.

FIG. 4 shows a configuration diagram of an encoder. The first scale 31a and the first encoder head 32a are provided to face each other. The second scale 31b and the second encoder head 32b are provided to face each other. The third scale 31c and the third encoder head 32c are provided to face each other.

The first encoder head 32a includes a light source (including a coherent light source and a slit for urging coherence) 33a comprising, for example, an LED, four photodetectors (PD) 34a1, 34a2, 34a3, 34a4, a first switch SW31a and a second switch SW32a.

The second encoder head 32b includes a light source (including a coherent light source and a slit for urging coherence) 33b comprising, for example, an LED, four photodetectors (PD) 34b1, 34b2, 34b3, 34b4, a first switch SW31b and a second switch SW32b.

The third encoder head 32c includes a light source (including a coherent light source and a slit for urging coherence) 33c comprising, for example, an LED, four photodetectors (PD) 34c1, 34c2, 34c3, 34c4, a first switch SW31c and a second switch SW32c.

An LED driver 39a is connected to the light source 33a in the first encoder head 32a. The LED driver 39a supplies a current to the light source 33a, and turns on the light source 33a with a predetermined luminance. A luminance setting memory M3a is connected to the LED driver 39a. A luminance setting value for turning on the light source 33a with the predetermined luminance is stored in the luminance setting memory M3a.

An LED driver 39b is connected to the light source 33b in the second encoder head 32b. The LED driver 39b supplies a current to the light source 33b, and turns on the light source 33b with a predetermined luminance. A luminance setting memory M3b is connected to the LED driver 39b. A luminance setting value for turning on the light source 33b with the predetermined luminance is stored in the luminance setting memory M3b.

An LED driver 39c is connected to the light source 33c in the third encoder head 32c. The LED driver 39c supplies a current to the light source 33c, and turns on the light source 33c with a predetermined luminance. A luminance setting memory M3c is connected to the LED driver 39c. A luminance setting value for turning on the light source 33c with the predetermined luminance is stored in the luminance setting memory M3c.

The luminance setting memories M3a, M3b, M3c are, for example, nonvolatile memories, or physical memories for a pull-up/pull-down caused by resistance or for a short circuit of wiring lines.

Thus, according to the fourth embodiment, the encoder heads 32a, 32b, 32c are increased in size by the LED drivers 39a, 39b, 39c, as compared with the first to third embodiments previously described. However, the encoder heads 32a, 32b, 32c can be reduced in area when compared with the processing of encoder signals output by the encoder heads 32a, 32b, 32c. Each of the encoder heads 32a, 32b, 32c can be considerably reduced in size, can be freely configured in shape or size, and can ensure the degree of freedom in designing, which is suitable for a case where a plurality of encoders are needed in a small place.

From the perspective of wiring, the encoder heads 32a, 32b, 32c can be connected in series by a connector unit 35, so that the degree of freedom in running the wiring lines can also be ensured. A signal processing circuit 36 to which a plurality of encoders are connected has only to have the number of input/output lines substantially suited to at least one encoder even if there are a plurality of encoders. This makes it possible to more effectively ensure the degree of freedom in the designing of the encoder. For the most effective use of the encoder, the outputs from the signal processing circuit 36 should be sent out by a signal output for one encoder head.

As in the second embodiment described above, when, for example, three encoder heads, here, the first to third encoder heads 32a, 32b, 32c are provided, 12 output line systems K, for example, have heretofore been needed to send the current signals for the phases 0°, 90°, 180°, 270° to the signal processing circuit 36 from each encoder head. However, when the present embodiment is used, the number of wiring lines can be reduced by, for example, four output line systems K.

The signal processing circuit 36 has only to sequentially process, for example, the current signals for the phases 0°, 90°, 180°, 270° sent from the first to third encoder heads 32a, 32b, 32c through the output line systems K. I/V converters 17-1 to 17-4 and first and second DC subtraction/gain circuits 17-5, 17-6 in the signal processing circuit 36 have only to be provided for one encoder head. Thus, the circuit configuration of the signal processing circuit 36 can be simpler. Conventionally, the I/V converters 17-1 to 17-4 and the first and second DC subtraction/gain circuits 17-5, 17-6 in the signal processing circuit 36 have to be provided for the number of provided encoder heads. Therefore, the circuit configuration is complicated and increased in size.

The first to third encoder heads 32a, 32b, 32c are provided with the LED drivers 39a, 39b, 39c, respectively. A bias current flowing to the light sources 33a, 33b, 33c that comprise the LEDs can be adjusted so that the current signals output from the encoder heads 32a, 32b, 32c may be brought to proper values. The bias current can be reduced, and the light sources 33a, 33b, 33c that comprise the LEDs are not connected in series. This also makes it possible to hold down the voltage of a power source V of the encoder.

Next, a fifth embodiment of the present invention is described with reference to the drawings.

FIG. 5A shows a block configuration diagram of a scale 41 and an encoder head 42 of an encoder. FIG. 5B shows a circuit configuration diagram of a photodetector 43 and a current amplifying unit 43I of the encoder.

As shown in FIG. 5A, the encoder comprises the scale 41 and the encoder head 42. The encoder head 42 includes a light source 44, the photodetector 43 and the current amplifying unit 43I. The photodetector 43 generates a current signal IP41 corresponding to relative displacement of the scale 41 and the encoder head 42. The current amplifying unit 43I amplifies n times the current signal IP41 generated by the photodetector 43.

The current amplifying unit 43I includes a current acquiring circuit 43V and a current mirror circuit KM. The current acquiring circuit 43V keeps a constant bias voltage of the photodetector 43, and accurately obtains the current signal IP41 that changes due to the relative displacement of the scale 41 and the encoder head 42 detected by the photodetector 43.

The current mirror circuit KM amplifies, n times by a current mirror ratio n, the current signal IP41 acquired by the current acquiring circuit 43V (n×IP241).

When such a current amplifying unit 43I is provided, the current signal IP41 generated by the photodetector 43 is amplified and can thereby be considerably changed and stabilized. As a result, there is no effect of surrounding noise or crosstalk.

The current amplifying unit 43I can be provided in each of the encoder heads 2a, 2b, 12a, 12b, 12c, ..., 32a, 32b, 32c in the first to fourth embodiments described above.

Although the number of encoders is five in the first to fifth embodiments described above, the number of encoders is not limited.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encoder comprising:
   one or more encoder heads which detect relative displacement of the one or more encoder heads and one or more scales;
   one signal processing unit which processes one or more electric signals output from the one or more encoder heads; and
   a connector unit which is located on the side of the one or more encoder heads between the one or more encoder heads and the signal processing unit and which groups together the one or more electric signals output from the one or more encoder heads;
   wherein the one or more electric signals output from the one or more encoder heads include phase information, and
   the connector unit groups together the electric signals including the same kind of phase information out of the one or more electric signals output from the one or more encoder heads.

2. The encoder according to claim 1, wherein the one or more electric signals output from the one or more encoder heads include current signals.

3. The encoder according to claim 1, wherein the one or more encoder heads include current amplifying units which amplify the one or more electric signals.

4. The encoder according to claim 1, wherein the connector unit connects output lines of N encoder heads by the number of output lines for one encoder head or one of N−1 encoder heads.

5. The encoder according to claim 1, wherein the signal processing unit processes the one or more electric signals time-divisionally output from the one or more encoder heads and then outputs the electric signals as a signal for one encoder head.

6. An encoder comprising:
   one or more scales;
   one or more encoder heads which detect relative displacement of the one or more encoder heads and the one or more scales;
   one signal processing unit which processes one or more electric signals output from the one or more encoder heads;
   each of the one or more encoder heads including a light source which radiates light, and a photodetector which detects a pattern generated by transmission, reflection or interference caused when the light radiated from the light source is applied to the one or more scales,
   an output control unit which is located at the subsequent stage of the one or more encoder heads and which outputs the electric signal of the one or more encoder heads; and
   a connector unit which is located at the subsequent stage of the one or more encoder heads and at the prior stage of the signal processing unit and which groups together the one or more electric signals output from the one or more encoder heads,
   wherein the signal processing unit processes the one or more electric signals from the one or more encoder heads and then outputs the electric signals as a signal for one encoder head;
   wherein the one or more electric signals output from the one or more encoder heads include phase information, and
   the connector unit groups together the electric signals including the same kind of phase information out of the one or more electric signals output from the one or more encoder heads.

7. The encoder according to claim 6, wherein the output control unit turns on or off outputs of the one or more electric signals in the one or more encoder heads.

8. The encoder according to claim 6, wherein the output control unit turns on or off the light sources in the one or more encoder heads.

9. The encoder according to claim 6, wherein the one or more electric signals output from the one or more encoder heads include current signals.

10. The encoder according to claim 6, wherein the one or more encoder heads include current amplifying units which amplify the one or more electric signals.

11. The encoder according to claim 6, wherein the connector unit connects output lines of N encoder heads by the number of output lines for one encoder head or one of N−1 encoder heads.

12. The encoder according to claim 6, further comprising:
   a driver which drives the light sources included in the encoder heads,
   the light sources being connected in series to the driver.

13. The encoder according to claim 6, further comprising:
a plurality of drivers which are respectively provided in the encoder heads and which drive the light sources included in the encoder heads.

14. The encoder according to claim 6, wherein the signal processing unit processes the electric signals time-divisionally output from the one or more encoder heads and then outputs the electric signals as a signal for one encoder head.

15. An encoder comprising:
one or more scales;
one or more encoder heads which detect relative displacement of the one or more encoder heads and the one or more scales;
one signal processing unit which processes one or more electric signals output from the one or more encoder heads;
each of the one or more encoder heads including a light source which radiates light, and a photodetector which detects a pattern generated by transmission, reflection or interference caused when the light radiated from the light source is applied to the one or more scales,
an output control unit which is located at the subsequent stage of the one or more encoder heads and which outputs the electric signal of the one or more encoder heads; and
a connector unit which is located at the subsequent stage of the one or more encoder heads and at the prior stage of the signal processing unit and which groups together the one or more electric signals output from the one or more encoder heads,
wherein the signal processing unit processes the one or more electric signals from the one or more encoder heads and then outputs the electric signals as a signal for one encoder head;
wherein each of the encoder heads is provided with one light source and a plurality of photodetectors,
the photodetectors output the electric signals including different kinds of phase information, and
the connector unit groups together the electric signals including the same kind of phase information out of the electric signals output from the encoder heads.

16. The encoder according to claim 15,
wherein the photodetectors include output terminals which output the electric signals, respectively, and
the connector unit connects together the output terminals which output the electric signals including the same kind of phase information out of the output terminals of the photodetectors, and the connector unit groups together the electric signals including the same kind of phase information out of the electric signals output from the photodetectors.

\* \* \* \* \*